US008375130B2

(12) United States Patent
Eberlein et al.

(10) Patent No.: US 8,375,130 B2
(45) Date of Patent: Feb. 12, 2013

(54) SHARED RESOURCE DISCOVERY, CONFIGURATION, AND CONSUMPTION FOR NETWORKED SOLUTIONS (75) Inventors: Peter Eberlein, Malsch (DE); Bare Said, St. Leon (DE)

(73) Assignee: SAP AG, Walldorf (DE)

( * ) Notice: Subject to any disclaimer, the term of this patent is extended or adjusted under 35 U.S.C. 154(b) by 236 days.

(21) Appl. No.: 12/970,873

(22) Filed: Dec. 16, 2010

(65) Prior Publication Data
US 2012/0158966 A1 Jun. 21, 2012

(51) Int. Cl.
*G06F 15/173* (2006.01)

(52) U.S. Cl. .......................... 709/226; 709/223; 709/224

(58) Field of Classification Search .......... 709/223–224, 709/226, 220
See application file for complete search history.

(56) References Cited

U.S. PATENT DOCUMENTS

| | | | | |
|---|---|---|---|---|
| 2003/0217176 | A1* | 11/2003 | Beunings | 709/238 |
| 2004/0068714 | A1* | 4/2004 | Deimel et al. | 717/101 |
| 2004/0103193 | A1* | 5/2004 | Pandya et al. | 709/224 |
| 2006/0224702 | A1* | 10/2006 | Schmidt et al. | 709/219 |
| 2006/0253587 | A1* | 11/2006 | Tullis et al. | 709/226 |
| 2008/0167977 | A1* | 7/2008 | Auvenshine et al. | 705/34 |
| 2009/0022092 | A1* | 1/2009 | MacInnis et al. | 370/328 |
| 2009/0172674 | A1* | 7/2009 | Bobak et al. | 718/101 |
| 2010/0317291 | A1* | 12/2010 | Richardson | 455/63.1 |
| 2011/0047275 | A1* | 2/2011 | Jones et al. | 709/226 |
| 2011/0225017 | A1* | 9/2011 | Radhakrishnan | 705/7.25 |
| 2012/0089735 | A1* | 4/2012 | Attaluri et al. | 709/226 |

* cited by examiner

*Primary Examiner* — Philip B Tran
(74) *Attorney, Agent, or Firm* — Mintz, Levin, Cohn, Ferris, Glovsky and Popeo, P.C.

(57) ABSTRACT

A networked solution offering a software-based service via a networked architecture having a system landscape can discover a shared resource within the system landscape, for example by accessing a landscape directory comprising information about a plurality of shared resources available in the system landscape. The information about the discovered shared resource can include a second networked solution within the system landscape that has previously configured the discovered shared resource. Configuration settings can be retrieved for the discovered shared resource from the second networked solution. Using the retrieved configuration settings, a shared resource-specific communication channel can be determined for the networked solution to access the discovered shared resource in a peer-to-peer manner. A resource type-specific application programming interface can be provided to the software-based service to enable consumption of the discovered shared resource by the software-based service. Related methods, systems, and articles of manufacture are described.

19 Claims, 5 Drawing Sheets

SHARED RESOURCE DISCOVERY, CONFIGURATION, AND CONSUMPTION FOR NETWORKED SOLUTIONS

TECHNICAL FIELD

The subject matter described herein relates to discovery, configuration, and consumption of shared resources in networked solutions.

BACKGROUND

Networked solutions can be offered for on-premise installation or consumption as on-demand services (e.g. via cloud computing). Customers are generally more willing to buy or rent new products (e.g., software products) if those new products can be combined with existing products to operate as an integrated solution. Consequently, it is important to offer customers the ability to integrate networked solution products in the customers' system landscapes.

SUMMARY

In one aspect, a computer-implemented method includes discovering, by a networked solution offering a software-based service via a networked architecture having a system landscape, a discovered shared resource within the system landscape. The discovering includes accessing a landscape directory that includes information about a plurality of shared resources available in the system landscape. The information about the discovered shared resource includes a second networked solution within the system landscape that has previously configured the discovered shared resource. Configuration settings for the discovered shared resource are retrieved from the second networked solution, and a shared resource-specific communication channel for the networked solution to access the discovered shared resource in a peer-to-peer manner is determined using the retrieved configuration settings. A resource type-specific application programming interface is provided to the software-based service to enable consumption of the discovered shared resource by the software-based service.

In some variations one or more of the following can optionally be included. The discovered shared resource can be added to a locally stored list of available shared resources that are available to the networked solution. The networked solution can announce an availability of a new shared resource upon addition and configuration by the networked solution of the new shared resource by sending information about the new shared resource collected from an administrator when the new shared resource is configured in the networked solution to at least one other networked solution. The retrieving of the configuration settings can occur at a time selected from immediately after the discovering of the discovered shared resource, when the discovered shared resource is first needed by the networked solution, and when previously retrieved configuration settings for the discovered shared resource are determined to no longer be valid. The networked solution can deliver, to a second networked resource in the system landscape in response to a peer-to-peer request from the second networked resource, at least one of the discovered shared resource and another shared resource that the networked solution has previously configured. The networked architecture can include a multi-tenant software architecture that includes an application server and a data repository. The application server can provide access for each of a plurality of organizations to one of a plurality of client tenants, each of which includes a customizable, organization-specific version of a core software platform. The networked solution can include an externally provided application that requires one or more local shared resources of a client machine accessing one of the plurality of tenants.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
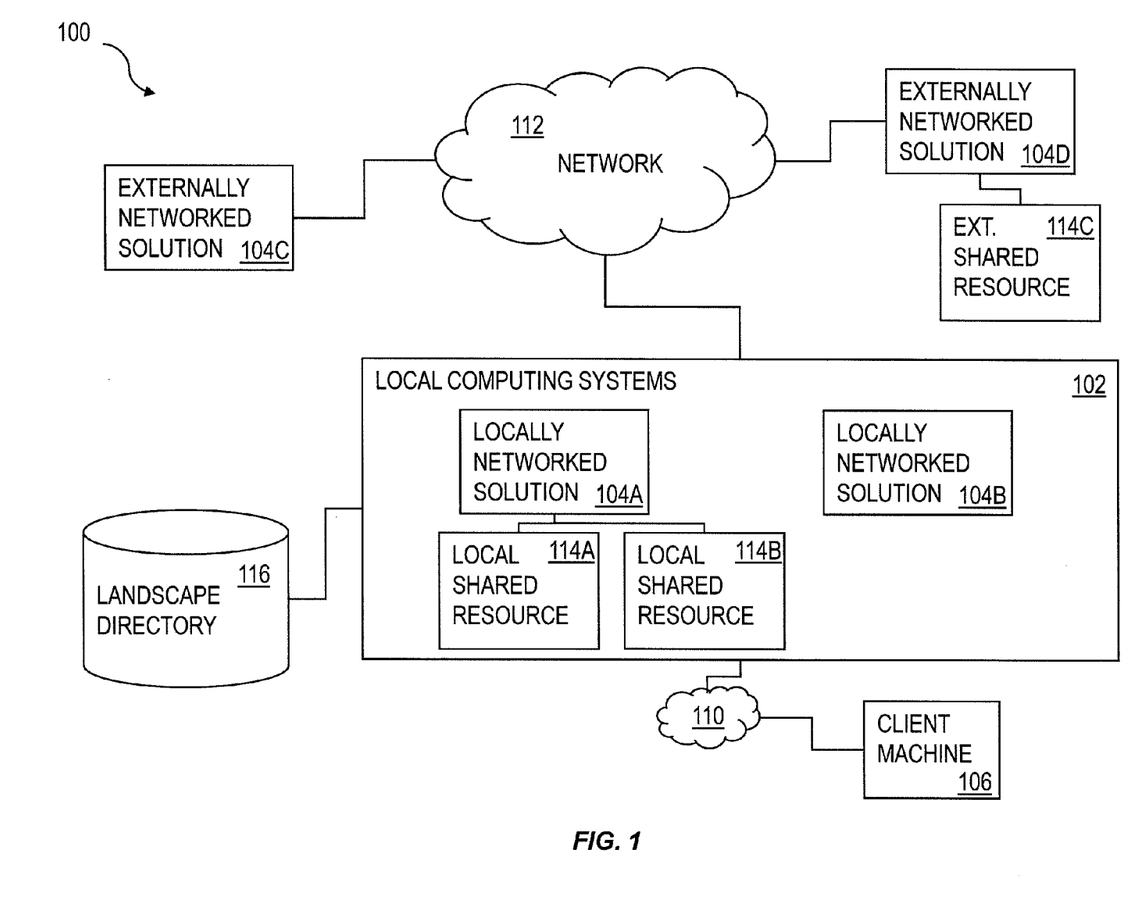
FIG. 1 is a diagram of a system landscape for an organization including local and external networked solutions and shared resources.

A customer using a networked architecture that includes multiple networked solutions can typically be interested in adding another networked solution to the system landscape 100 of the networked architecture. Doing so without significant requirements for configuration, for example by allowing the new networked solution to embed itself in the existing landscape and to derive most of its own configuration from the existing configuration of already deployed networked solutions, can be advantageous. For the purposes of this disclosure, the term networked solution applies to any software system, application, component, or the like offering software-based services (e.g. one or more business applications) that is accessible over a networked computing architecture, such as for example in a cloud-based computing system, a software as a service configuration, etc.

Aspects relating to configuration of communication channels between networked solutions can be addressed by existing approaches, such as for example a cloud solutions landscape directory as described in co-pending and co-owned patent application Ser. No. 12/953,300. However, automated discovery, configuration and consumption of shared resources, such as for example printers, mail servers, fax services, directory services (e.g. for contact information, etc.), and the like, are not yet available.

To address these and potentially other issues with currently available approaches, one or more implementations of the current subject matter provide methods, systems, articles or manufacture, and the like that can, among other possible advantages, provide a shared resource discovery, configuration, and consumption module (referred to herein as a "DCCM") that can be integrated into each component of a networked solution to enable that component to more efficiently utilize available shared resources within an existing networked solution landscape.

FIG. 1 shows a diagram of a system landscape 100 of an organization that, in this example, has a local computing system 102 that hosts two locally networked solutions 104A, 104B. The local computing system 102 can include one or multiple machines that can be accessed by users locally or via a client machine 106 within the organization, for example over a local area network 110 or the like. The organization also subscribes to two externally networked solutions 104C, 104D that are accessible over an external network 112, such as for example a wide area network, the Internet, etc. The externally networked solutions 104C, 104D can, for example, be applications available through a software as a service (SaaS) offering. In the example of FIG. 1, one of the locally networked solutions 104A is configured to use two local shared resources 114A, 114B, for example a printer and a fax service. One of the externally networked solutions 104D is configured to use an external shared resource 114C. Unless otherwise specified, throughout the remainder of this disclosure networked solutions and shared resources will be referred to simply as "networked solution 104" and "shared resource 114," respectively, regardless of whether the networked solution 104 or shared resource 114 is local to the organization or external (e.g. "in the cloud").

A landscape directory 116 of the organization can store and track information characterizing the system landscape 100 of networked solutions 104 (both local and external) available to users within the organization and shared resources 114 that can be called by the various networked solutions 104. Advantageously, all networked solutions 104 in the system landscape can be configured to use all available shared resources 114. However, with various networked solutions 104 and shared resources 114 developed and supported by different vendors and administered by different entities, providing access to all of the shared resources 114 can be very time consuming. The current subject matter provides an automated approach to provisioning the various shared resources 114 in the system landscape 100 so that any appropriate and available shared resource 114 can be readily discovered, configured, and consumed by any networked solution 104 in the system landscape 100 that has a need to use it.

Figure 2:
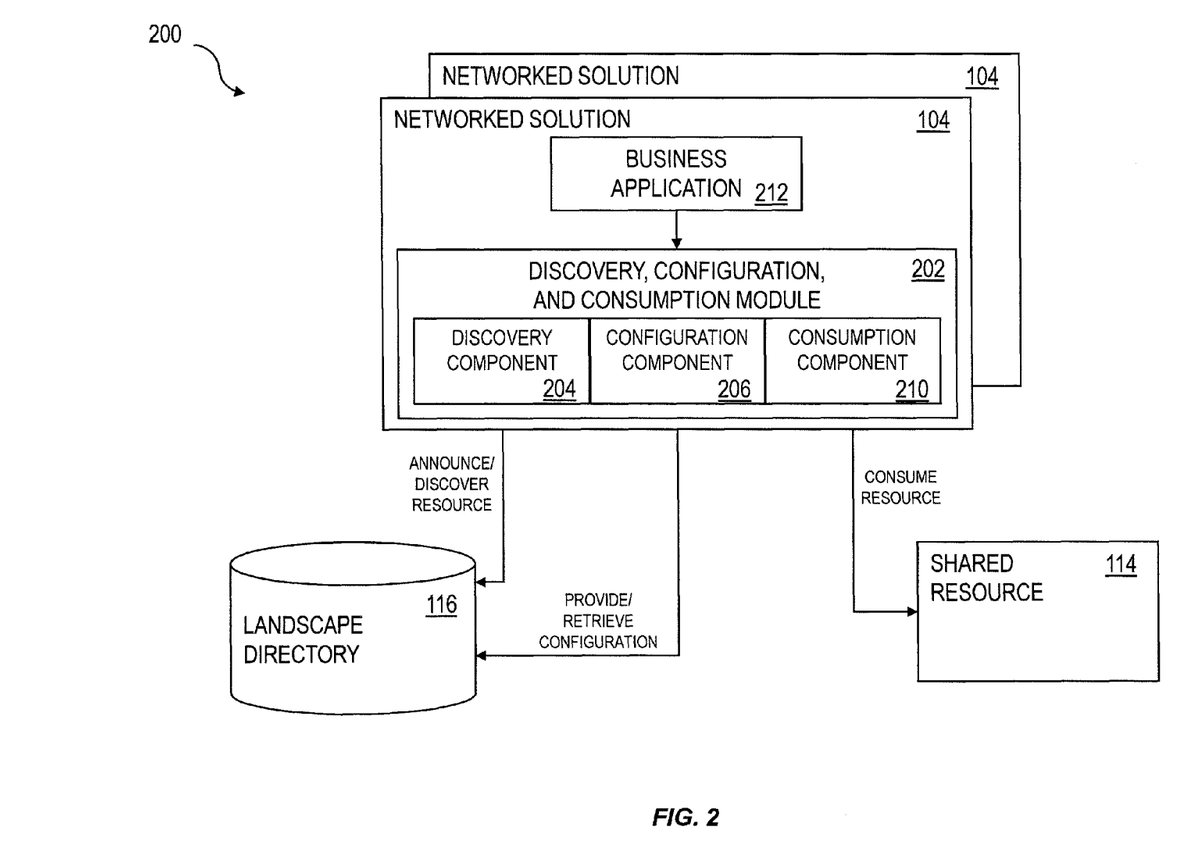
FIG. 2 is a diagram showing features of a discovery, configuration, and consumption module.

As shown in the diagram of a system landscape 200 in FIG. 2, implementations of the current subject matter can provide each networked solution 104 with a discovery, configuration, and consumption module 202 (DCCM) that includes a discovery component 204, a configuration component 206, and a consumption component 210. It should be noted that, while the following descriptions refer to these three components within a DCC module 202, the current subject matter can also be implemented in other ways, for example as one or more modules that each perform at least some of the functions described below.

At one or more points in the life-cycle of a networked solution 104, a networked solution 104 can invoke its DCCM 202 to optimize efficient use of available shared resources 114 in the system landscape 100. For example, when a new networked solution 104 is connected to an existing system landscape 100, it can perform an initial discovery of available shared resources 114 that can be used in the context of the business application provided by the new networked solution 104. For example, a networked solution 104 for lead generation can leverage a shared fax service to send out letters via fax to potential customers.

Whenever a new shared resource 114 is added and configured in a networked architecture, the discovery component of a DCCM 202 of a networked solution 104 announces the new shared resource 114 to other networked solutions 104 connected to the architecture. To do so, a networked solution 104 invokes the DCCM 202 with information about the shared resource 114 that was collected from the administrator when the shared resource 114 was configured in this networked solution 104.

A networked solution 104 can refresh a list of shared resources 114 available to the networked solution 104 that the needs of its business application(s) 212. The refreshing of the list can be performed at a regular interval, on occurrence of a triggering event (e.g. when a previously available shared resource becomes unavailable), or the like. Thus, the networked solution 104 locally stores information about those shared resources 114 that it is likely to utilize once the DCCM 202 of the networked solution 104 has discovered them. If this locally stored information becomes outdated or if a demand for an additional shared resources 114 arises or is otherwise is created (e.g. by a change in business scope configuration), the networked solution 104 can discover additional shared resources 114. Re-discovery occurring on a regular interval can be advantageous because the locally stored information at the networked solution 104 can be updated prior to the first time a shared resource 114 is needed by a business function offered by the networked resource.

A new networked solution 104 added to an existing system landscape 100 can retrieve configuration settings for a discovered shared resource 114 from an existing networked solution 104 that has been previously configured for the existing system landscape 100. Retrieval of the configuration settings can occur immediately after discovery by the DCCM 202 of the new networked solution 104 of the shared resource 114, on first use or need by the new networked solution 104 of the shared resource 114, etc. and can be repeated when a shared resource 114 becomes unavailable, for example because the configuration settings are no longer valid.

A networked solution 104 can provide configuration settings about a shared resource 114 that has been configured in that networked solution 104 to other networked solutions 104 that have a need for use of the shared resource 114. Such configuration settings can include URLs, authentication credentials, configuration parameters (e.g. a POP3 or SMTP URL for a shared mail server, the technical username and password to authenticate mail sending and receiving, settings like POP3 or IMAP, SSL or unencrypted communication, etc.), and the like.

A networked solution 104 can directly access shared resources 114 of other networked solutions 104 in a peer-to-peer manner, without need for central hubs. To do so, a shared resource-specific communication channel can be determined by the discovery component 204. The configuration settings retrieved by the configuration component 206 can be used.

The discovery component of the DCCM 202 can facilitate discovery of shared resources 114 by providing services for both announcing (registering) shared resources in a landscape directory 116 and by discovering available shared resources in the landscape directory 116, both initially and whenever new shared resources 114 are announced. Each shared resource 114 can receive a resource type specific identifier. A set of capabilities available from the shared resource 114 can be announced in the landscape directory 116. Shared resource types can include printers, mail servers, fax services, directory services and so on. Capabilities can include technical properties (e.g. one-sided printing and duplex-printing, location information, etc. of a printer) as well as business relevant criteria such as access restrictions to certain user groups (e.g. restricted mass mailing capabilities of a mail server).

Whenever a new shared resource 114 is connected to a networked solution 104 that is to be made available to other networked solutions 104, the discovery component 204 can send an announcement message to the landscape directory 116 with the shared resource type and capabilities to register the shared resource 114 there. This set of information can define the relevance of a shared resource 114 to other networked solutions 104. When a new networked solution 104 is added to a customer system landscape 100, the discovery component 204 can connect to the landscape directory 116 to request a list of available shared resources 114 that are required for needs of a business application 212 of the networked solution 104. In this request, the relevant shared resource types and capabilities can be passed to filter the available list of shared resources 114 to find those shared resources 114 that match the business requirements.

If no matching shared resource 114 is discovered, the administrator of the new networked solution 104 can be prompted to add a new shared resource 114 to the networked solution 104 that matches the requirements. Otherwise, no user interaction is required. The discovery component 204 can repeat the request for a list of available shared resources 114 that needs of business applications 212 of the networked solution 104. The repetition can be performed at specific intervals and/or on certain triggering events (e.g. first logon by a user each day, etc.) to discover shared resources 114 as they are added to the customer's system landscape 100. A new interval can also be triggered when a previously available shared resource 114 becomes unavailable.

The discovery component 204 can handle all of these interactions transparently. Neither business users nor administrators need to be confronted with or even made aware of the discovery component 204 and its functions. Not even a business application 212 built on top of this technology need be aware of the underlying communication that occurs to prepare the consumption of the shared resources 114 discovered and configured by the DCCM 202.

The configuration component 206 can be activated for each shared resource 114 discovered by the discovery component 204. This activation can occur initially right after discovery and again when a configuration update becomes necessary because a previously configured shared resource 114 no longer works as expected. The configuration component 206 can determine the primary networked solution 104 where the original configuration settings are stored. The primary networked solution 104 can be the networked solution 104 in which the shared resource 114 was originally added to the customer's system landscape 100. The information about the primary networked solution 104 can be retrieved from the landscape directory 116 by the discovery component. The configuration component 206 of the requesting networked solution 104 can request the configuration settings from the primary networked solution 104, and the requesting networked solution 104 can set its own internal configuration according to the settings retrieved from the primary networked solution 104. The just configured networked solution 104 can then directly (peer-to-peer) consume the shared resource 114 and can also act as a secondary provider of configuration settings for this shared resource 114 if the primary networked solution 104 becomes unavailable. If such a replacement were to occur, the landscape directory 116 can replace the primary networked solution 104 for a shared resource 114 with one of the secondary networked solutions 104.

When a primary networked solution 104 receives a direct (peer-to-peer) request for configuration settings of one of its managed shared resources 114, it can deliver its current local configuration settings to that networked solution 104. Whenever the local configuration changes in the primary networked solution 104, the primary networked solution 104 can announce the change to the landscape directory 116 for other networked solutions 104 to become aware of this change.

Again, the DCCM 202 can hide all interactions with the landscape directory 116 and other networked solutions 104 from users, administrators and even the business application 212. A new shared resource 104 added to the customer system landscape 100 needs to be configured once in any of the connected networked solutions 104 to be made available to all networked solutions in the system landscape 100 without further configuration.

The consumption component 210 can include an interface to the business application 212 to encapsulate external shared resources 114 and offer resource type specific APIs to the business application 212 to consume the services provided by these shared resources 114. When a service request is made by the business application 212, the DCCM 202 can act as a proxy, accepting the request from the business application 212, determining the communication channel to the shared resource 114 determined by the discovery component 204, activating the configuration settings retrieved by the configuration component 206, and forwarding the request in a peer-to-peer manner directly to the shared resource 114.

If a request to the shared resource 114 were to fail, the DCCM 202 can apply a multi-level fallback strategy to recover from the error and provide the requested service from the shared resource 114 without need for user interaction. As part of such a fallback strategy, the consumption component 210 can trigger the configuration component 206 to retrieve the most up-to-date configuration settings from the current primary networked solution 104 for the failed shared resource 114. If new configuration settings were retrieved, the consumption component 210 can retry the request to the shared resource 114 with the new settings. If the problem remains unresolved, the consumption component 210 can trigger the discovery component 204 to obtain an updated list of available shared resources 114 that can process the current request from the business application 212. If an appropriate shared resource 114 other than the failed shared resource 114 is available, the consumption component 210 can invoke the configuration component 206 to retrieve the configuration settings for this other shared resource 114 and can retry the request with the alternative shared resource 114. If such a change might impact the business user (such as for example if a print request is sent to a different but close-by printer), the consumption component 210 can provide information about the different shared resource 114 to the business application 212 to inform the business user. Otherwise, the business user need not be notified regarding a successful retry with an alternative shared resource 114.

Figure 3:
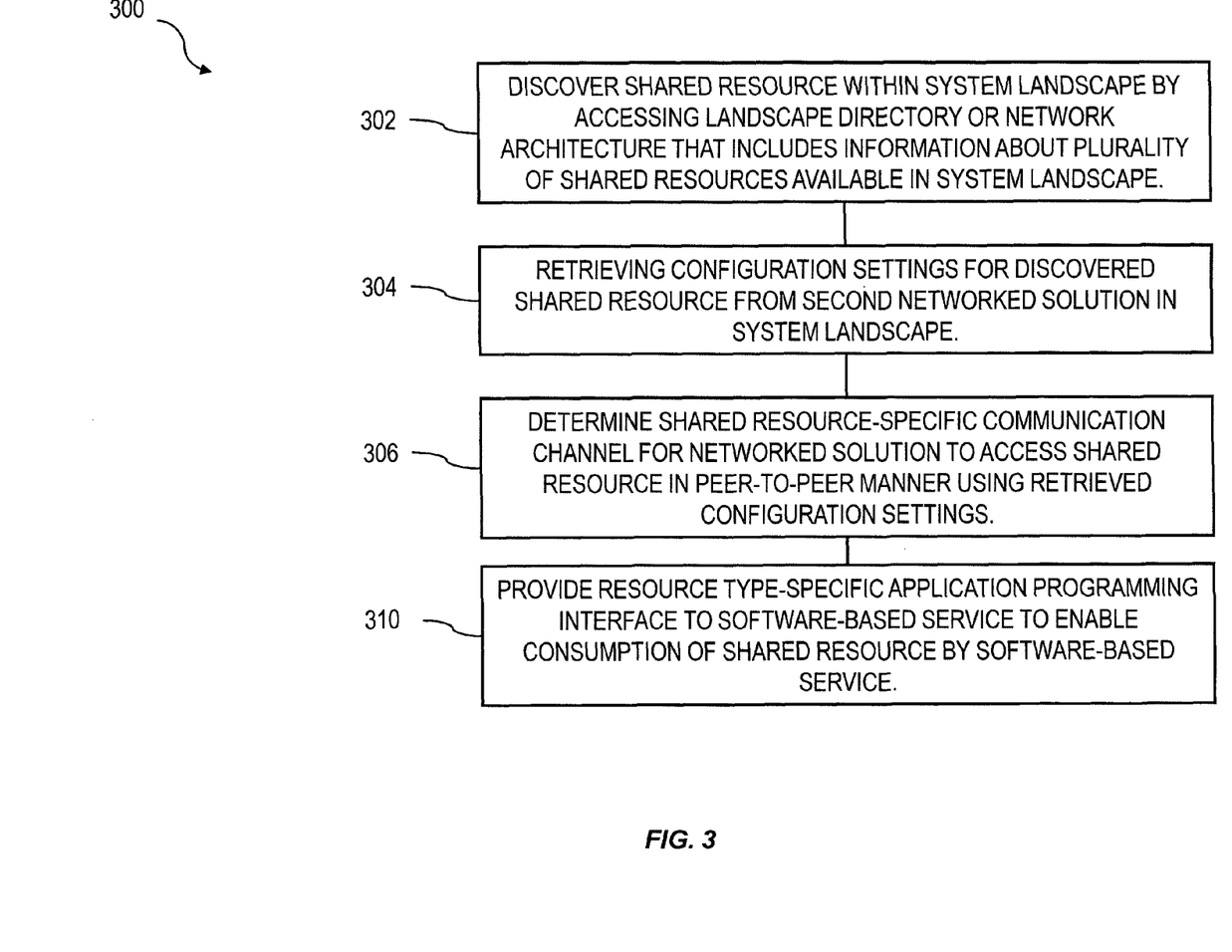
FIG. 3 is a process flow diagram illustrating aspects of a method consistent with implementations of the current subject matter.

FIG. 3 shows a process flow chart 300 illustrating features of a method consistent with the current subject matter. At 302, a first networked solution 104 offering a software-based service 212 via a networked architecture having a system landscape 100 discovers a discovered shared resource 114 within the system landscape 100. The discovering includes accessing a landscape directory 116 comprising information about a plurality of shared resources 114 available in the system landscape 100. The information about the discovered shared resource 114 includes a second networked solution 104 within the system landscape 100 that has previously configured the discovered shared resource 114. Configuration settings are retrieved by the first networked solution 104 at 304 for the discovered shared resource from the second networked solution 104. Using the retrieved configuration settings, a shared resource-specific communication channel for the networked solution 104 to access the discovered shared resource in a peer-to-peer manner is determined at 306. A resource type-specific application programming interface is provided by the first networked solution 104 to the software-based service 212 to enable consumption of the discovered shared resource 114 by the software-based service 212.

Figure 4:
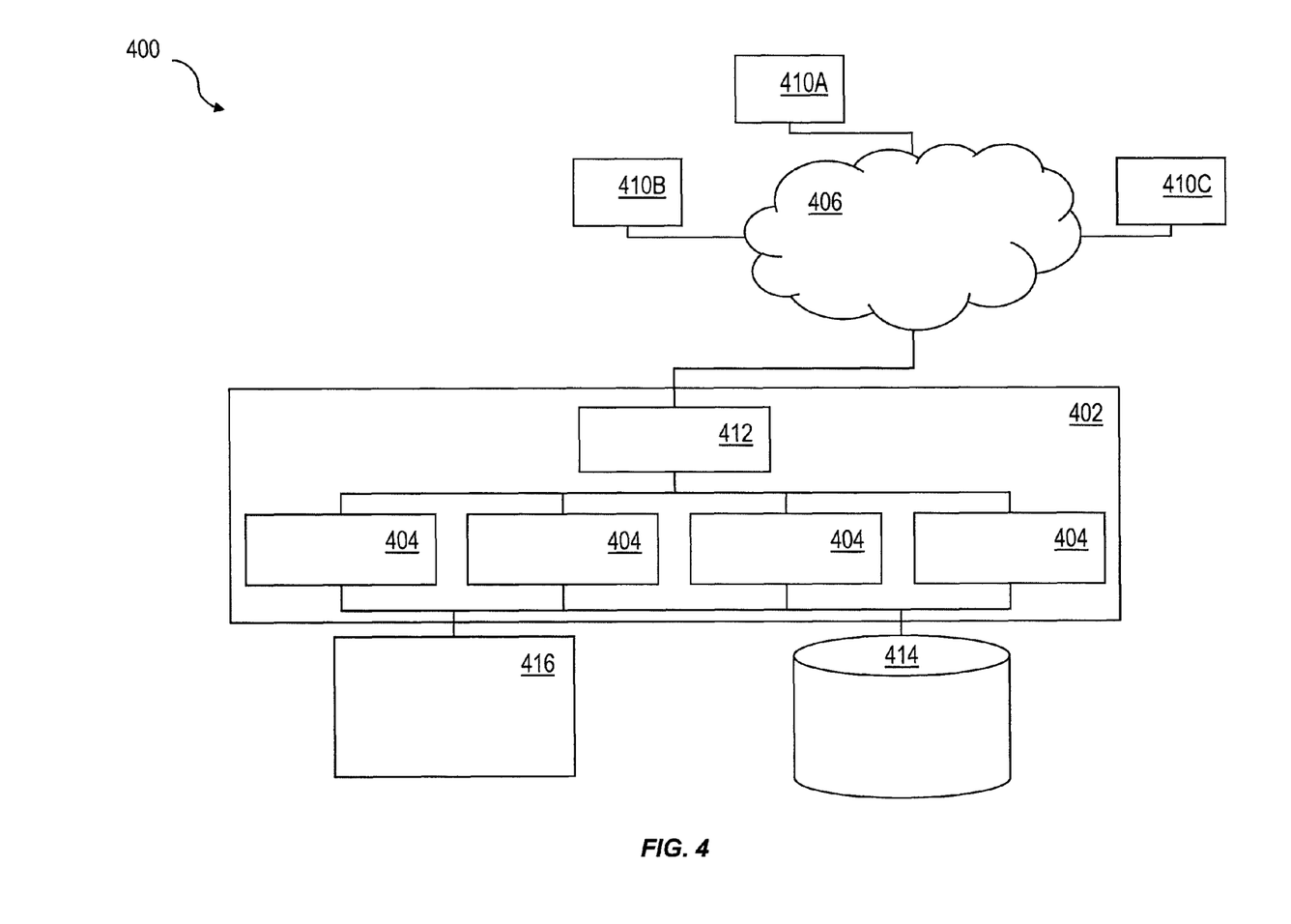
FIG. 4 is a diagram showing an example of a multi-tenant approach to providing customized software services to multiple organizations from a single architecture.

In an implementation, the system landscape can include a multi-tenant software delivery architecture 400, such as that illustrated in FIG. 4. A multi-tenant software delivery architecture 400 can include an application server 402, which can in some variations include multiple server systems 404 that are accessible over a network 406 from client machines operated by users at each of multiple organizations 410A-410C (referred to herein as "tenants" of a multi-tenant system) supported by a single software delivery architecture 400. For a system in which the application server 402 includes multiple server systems 404, the application server can include a load balancer 412 to distribute requests and actions from users at the one or more organizations 410A-410C to the one or more server systems 404. A user can access the software delivery architecture across the network using a thin client, such as for example a web browser or the like, or other portal software running on a client machine. The application server 402 can access data and data objects stored in one or more data repositories 414. The application server 402 can also serve as a middleware component via which access is provided to one or more external software components 416 that can be provided by third party developers. In an implementation, an external software component 416 can be a networked solution 104 as discussed above. One or more shared resources, for example of the application server or a client machine accessing one of the tenants, can be discovered, configured, and consumed by the external software component 416 in a manner similar to that discussed above.

Figure 5:
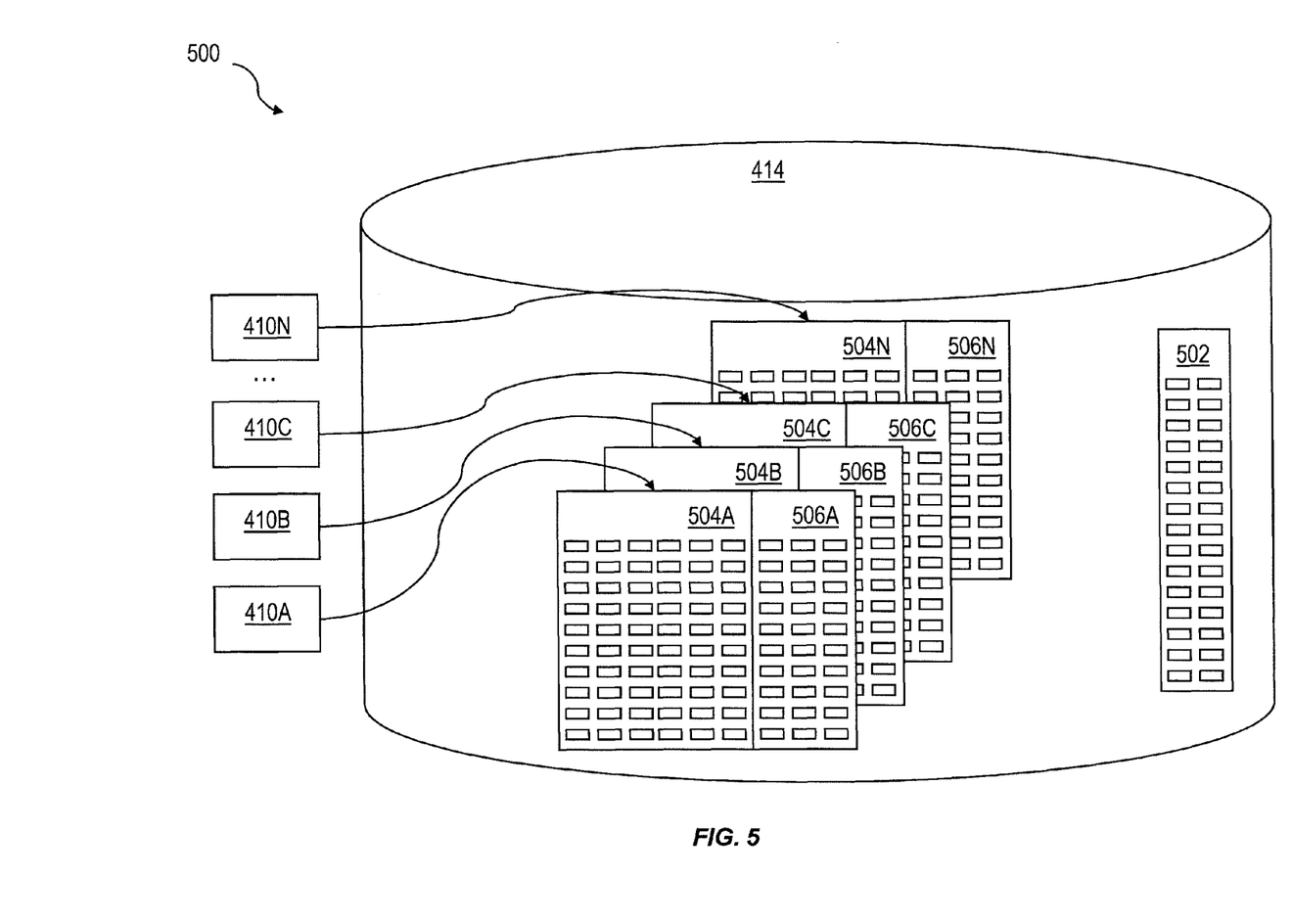
FIG. 5 is a diagram showing storage of both core software package data objects and tenant-specific data objects for each of multiple tenants of a multi-tenant system.

To provide for customization of the core software platform for each of multiple organizations supported by a single software delivery architecture 400, the data and data objects stored in the repository or repositories 414 that are accessed by the application server 402 can include three types of content as shown in FIG. 5: core software platform content 502, system content 504, and tenant content 506. Core software platform content 502 includes content that represents core functionality and is not modifiable by a tenant. System content 504 can in some examples be created by the runtime of the core software platform and can include core data objects that are modifiable with data provided by each tenant. For example, if the core software platform is an ERP system that includes inventory tracking functionality, the system content 504A-504N can include data objects for labeling and quantifying inventory. The data retained in these data objects are tenant-specific: for example, each tenant 410A-410N stores information about its own inventory. Tenant content 506A-506N includes data objects or extensions to other data objects that are customized for one specific tenant 410A-410N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 506 can include condition records in generated condition tables, access sequences, price calculation results, or any other tenant-specific values. A combination of the software platform content 502 and system content 504 and tenant content 506 of a specific tenant are presented to users from that tenant such that each tenant is provided access to a customized solution whose data are available only to users from that tenant.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 402 that includes multiple server systems 404 that handle processing loads distributed by a load balancer 412. Potential benefits from such an arrangement can include, but are not limited to, high and reliably continuous application server availability and minimization of unplanned downtime, phased updating of the multiple server systems 404 to permit continuous availability (one server system 404 can be taken offline while the other systems continue to provide services via the load balancer 412), scalability via addition or removal of a server system 404 that is accessed via the load balancer 412, and de-coupled lifecycle processes (such as for example system maintenance, software upgrades, etc.) that enable updating of the core software independently of tenant-specific customizations implemented by individual tenants.

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed:

1. A computer program product comprising a non-transitory machine-readable medium storing instructions that, when executed by at least one programmable processor, cause the at least one programmable processor to perform operations comprising:

discovering, by a networked solution offering a software-based service via a networked architecture having a system landscape, a discovered shared resource within the system landscape, the discovering comprising accessing a landscape directory comprising information about a plurality of shared resources available in the system landscape, the information about the discovered shared resource comprising a second networked solution within the system landscape that has previously configured the discovered shared resource;

retrieving configuration settings for the discovered shared resource from the second networked solution;

determining, using the retrieved configuration settings, a shared resource-specific communication channel for the networked solution to access the discovered shared resource in a peer-to-peer manner; and providing a resource type-specific application programming interface to the software-based service to enable consumption of the discovered shared resource by the software-based service.

2. A computer program product as in claim 1, wherein the operations further comprise: adding the discovered shared resource to a locally stored list of available shared resources that are available to the networked solution.

3. A computer program product as in claim 1, wherein the operations further comprise: announcing, by the networked solution, an availability of a new shared resource upon addition and configuration by the networked solution of the new shared resource, the announcing comprising sending, to at least one other networked solution, information about the new shared resource collected from an administrator when the new shared resource is configured in the networked solution.

4. A computer program product as in claim 1, wherein the retrieving of the configuration settings occurs at a time selected from immediately after the discovering of the discovered shared resource, when the discovered shared resource is first needed by the networked solution, and when previously retrieved configuration settings for the discovered shared resource are determined to no longer be valid.

5. A computer program product as in claim 1, wherein the operations further comprise: delivering, by the networked solution to a second networked resource in the system landscape in response to a peer-to-peer request from the second networked resource, at least one of the discovered shared resource and another shared resource that the networked solution has previously configured.

6. A computer program product as in claim 1, wherein the networked architecture comprises a multi-tenant software architecture comprising an application server and a data repository, the application server providing access for each of a plurality of organizations to one of a plurality of client tenants, each of the plurality of client tenants comprising a customizable, organization-specific version of a core software platform; and wherein the networked solution comprises an externally provided application that requires one or more local shared resources of a client machine accessing one of the plurality of tenants.

7. A system comprising:
at least one programmable processor; and
at least one machine-readable medium storing instructions that, when executed by the at least one programmable processor, cause the at least one programmable processor to perform operations comprising:

discovering, by a networked solution offering a software-based service via a networked architecture having a system landscape, a discovered shared resource within the system landscape, the discovering comprising accessing a landscape directory comprising information about a plurality of shared resources available in the system landscape, the information about the discovered shared resource comprising a second networked solution within the system landscape that has previously configured the discovered shared resource;

retrieving configuration settings for the discovered shared resource from the second networked solution;

determining, using the retrieved configuration settings, a shared resource-specific communication channel for the networked solution to access the discovered shared resource in a peer-to-peer manner; and providing a resource type-specific application programming interface to the software-based service to enable consumption of the discovered shared resource by the software-based service.

8. A system as in claim 7, wherein the operations further comprise: adding the discovered shared resource to a locally stored list of available shared resources that are available to the networked solution.

9. A system as in claim 7, wherein the operations further comprise: announcing, by the networked solution, an availability of a new shared resource upon addition and configuration by the networked solution of the new shared resource, the announcing comprising sending, to at least one other networked solution, information about the new shared resource collected from an administrator when the new shared resource is configured in the networked solution.

10. A system as in claim 7, wherein the retrieving of the configuration settings occurs at a time selected from immediately after the discovering of the discovered shared resource, when the discovered shared resource is first needed by the networked solution, and when previously retrieved configuration settings for the discovered shared resource are determined to no longer be valid.

11. A system as in claim 7, wherein the operations further comprise: delivering, by the networked solution to a second networked resource in the system landscape in response to a peer-to-peer request from the second networked resource, at least one of the discovered shared resource and another shared resource that the networked solution has previously configured.

12. A system as in claim 7, wherein the networked architecture comprises a multi-tenant software architecture comprising an application server and a data repository, the application server providing access for each of a plurality of organizations to one of a plurality of client tenants, each of the plurality of client tenants comprising a customizable, organization-specific version of a core software platform; and wherein the networked solution comprises an externally provided application that requires one or more local shared resources of a client machine accessing one of the plurality of tenants.

13. A computer-implemented method comprising:

discovering, by a networked solution offering a software-based service via a networked architecture having a system landscape, a discovered shared resource within the system landscape, the discovering comprising accessing a landscape directory comprising information about a plurality of shared resources available in the system landscape, the information about the discovered shared resource comprising a second networked solution within the system landscape that has previously configured the discovered shared resource;

retrieving configuration settings for the discovered shared resource from the second networked solution;

determining, using the retrieved configuration settings, a shared resource-specific communication channel for the networked solution to access the discovered shared resource in a peer-to-peer manner; and providing a resource type-specific application programming interface to the software-based service to enable consumption of the discovered shared resource by the software-based service.

14. A method as in claim 13, further comprising: adding the discovered shared resource to a locally stored list of available shared resources that are available to the networked solution.

15. A method as in claim 13, further comprising: announcing, by the networked solution, an availability of a new shared resource upon addition and configuration by the networked solution of the new shared resource, the announcing comprising sending, to at least one other networked solution, information about the new shared resource collected from an administrator when the new shared resource is configured in the networked solution.

16. A method as in claim 13, wherein the retrieving of the configuration settings occurs at a time selected from immediately after the discovering of the discovered shared resource, when the discovered shared resource is first needed by the networked solution, and when previously retrieved configuration settings for the discovered shared resource are determined to no longer be valid.

17. A method as in claim 13, further comprising: delivering, by the networked solution to a second networked resource in the system landscape in response to a peer-to-peer request from the second networked resource, at least one of the discovered shared resource and another shared resource that the networked solution has previously configured.

18. A method as in claim 13, wherein the networked architecture comprises a multi-tenant software architecture comprising an application server and a data repository, the application server providing access for each of a plurality of organizations to one of a plurality of client tenants, each of the plurality of client tenants comprising a customizable, organization-specific version of a core software platform; and wherein the networked solution comprises an externally provided application that requires one or more local shared resources of a client machine accessing one of the plurality of tenants.

19. A method as in claim 13, wherein at least one of the discovering, the retrieving, the determining, and the providing is performed on at least one processor.

* * * * *